United States Patent
Luciew et al.

(10) Patent No.: US 9,533,720 B1
(45) Date of Patent: Jan. 3, 2017

(54) SPORTS HOOP FOR A MOTOR VEHICLE

(71) Applicant: FORD GLOBAL TECHNOLOGIES, LLC, Dearborn, MI (US)

(72) Inventors: Simon Luciew, Ardeer (AU); David Job, Viewbank (AU); Ryan Rawnsley, Pattaya (TH); Keong Fook Yip, Canterbury (AU); Shashi Bhushan, Sunshine (AU)

(73) Assignee: Ford Global Technologies, LLC, Dearborn, MI (US)

( * ) Notice: Subject to any disclaimer, the term of this patent is extended or adjusted under 35 U.S.C. 154(b) by 8 days.

(21) Appl. No.: 14/804,944

(22) Filed: Jul. 21, 2015

(51) Int. Cl.
　　B60J 9/00　　(2006.01)
　　B62D 35/00　　(2006.01)
　　B62D 27/06　　(2006.01)

(52) U.S. Cl.
　　CPC ............. *B62D 35/007* (2013.01); *B62D 27/06* (2013.01)

(58) Field of Classification Search
　　CPC .............................. B62D 35/007; B62D 27/06
　　See application file for complete search history.

(56) References Cited

U.S. PATENT DOCUMENTS

| | | | | |
|---|---|---|---|---|
| 5,018,779 A | * | 5/1991 | Lund | B62D 35/007 296/180.1 |
| 5,183,307 A | * | 2/1993 | Chiu, Jr. | B60R 11/06 296/100.04 |
| 5,301,913 A | * | 4/1994 | Wheatley | B60R 9/00 248/231.41 |
| 5,971,469 A | * | 10/1999 | Lund | B60J 7/1621 296/100.01 |
| D520,420 S | * | 5/2006 | Woods | D12/181 |
| 7,252,324 B1 | | 8/2007 | Nahm et al. | |
| 8,939,495 B2 | | 1/2015 | Kurata | |
| 9,409,609 B2 | * | 8/2016 | Camosy | B62D 27/06 |
| 2013/0334838 A1 | * | 12/2013 | Jeffrey | B62D 35/00 296/180.1 |
| 2015/0266363 A1 | * | 9/2015 | Yamaguchi | B62D 35/007 296/180.1 |
| 2016/0039478 A1 | * | 2/2016 | Tsuboi | B62D 65/16 296/180.1 |
| 2016/0236727 A1 | * | 8/2016 | Herndon | B62D 35/007 |

FOREIGN PATENT DOCUMENTS

| | | |
|---|---|---|
| CN | 201816658 U | 5/2011 |
| CN | 203497043 U | 3/2014 |
| CN | 203996505 U | 12/2014 |
| JP | H0710047 A | 1/1995 |

OTHER PUBLICATIONS

English machine translation of CN203497043U.
English machine translation of CN201816658U.
English machine translation of CN203996505U.
English machine translation of JPH0710047A.

* cited by examiner

*Primary Examiner* — Lori L Lyjak
(74) *Attorney, Agent, or Firm* — Jason Rogers; King & Schickli, PLLC

(57) ABSTRACT

A sports hoop is provided for a motor vehicle. The sports hoop includes a one-piece internal frame, an outer cover received over an outer surface of the internal frame and an inner cover received over an inner surface of the internal frame. Slip joints and expansion joints are provided to accommodate thermal expansion and contraction to maintain a more aesthetically pleasing appearance.

20 Claims, 14 Drawing Sheets

SPORTS HOOP FOR A MOTOR VEHICLE

TECHNICAL FIELD

This document relates generally to the motor vehicle equipment field and, more particularly, to a sports hoop for a pickup truck or a like motor vehicle.

BACKGROUND

A sports hoop is a large load box mounted spoiler for a pickup truck or similar motor vehicle. This document relates to a new and improved sports hoop incorporating a one-piece internal frame clad in a lightweight cover and incorporating slip joints and expansion joints so as to provide an aesthetically pleasing appearance under substantially any ambient temperature conditions to which the sports hoop might be exposed when in use.

SUMMARY

In accordance with the purposes and benefits described herein, a sports hoop is provided for a motor vehicle. That sports hoop comprises a one-piece internal frame, an outer cover received over an outer surface of the internal frame and an inner cover received over an inner surface of the internal frame. The sports hoop further includes a first group of slip joints connecting the outer cover to the one-piece internal frame and a second group of slip joints connecting the inner cover to the one-piece internal frame.

In one possible embodiment, the inner cover comprises a first end section, a center section and a second end section. A first expansion joint is provided between the first end section and the center section while a second expansion joint is provided between the center section and the second end section.

In one possible embodiment the outer cover is one continuous piece. The one-piece internal frame may be made from structural grade plastic material such as polypropylene long glass fiber 40%. Further, the outer cover and inner cover may be made from a thermoplastic olefin. In addition the one-piece internal frame includes a motor vehicle mounting point at each end.

In one possible embodiment the sport hoop also includes a support bracket between the outer cover and the one-piece internal frame. In one embodiment, the support bracket comprises three pieces. Further, in one possible embodiment an adhesive foam is provided between the support bracket and the one-piece internal frame.

In one possible embodiment, the inner cover connects to the support bracket sandwiching the one-piece internal frame between the inner cover and the outer cover. Further, the inner cover is connected to the support bracket by a plurality of resilient fastening clips. In addition, two reinforced mounting brackets may be secured to the one-piece internal frame adjacent the motor vehicle mounting point at each end of the one-piece internal frame. These reinforced mounting brackets help to anchor the sports hoop to the motor vehicle.

In the following description, there are shown and described several preferred embodiments of the sports hoop. As it should be realized, the sports hoop is capable of other, different embodiments and its several details are capable of modification in various, obvious aspects all without departing from the sports hoop as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the sports hoop and together with the description serve to explain certain principles thereof. In the drawing figures.

Figure 1:
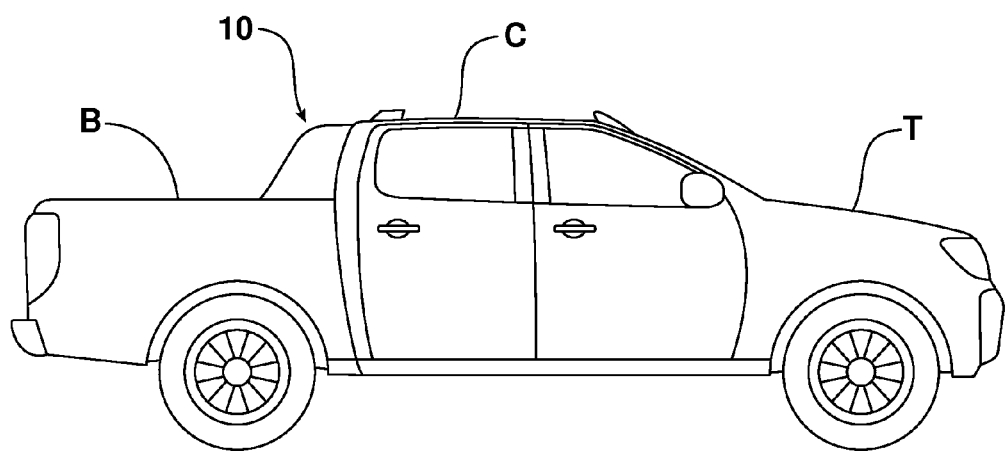
FIG. 1 is a side elevational view of a pickup truck incorporating the sports hoop that is the subject matter of this document.

FIGS. 3*a*-3*g* are various perspective views illustrating the process of assembling the sports hoop that is illustrated in exploded form in FIG. 1.

Figure 3A:
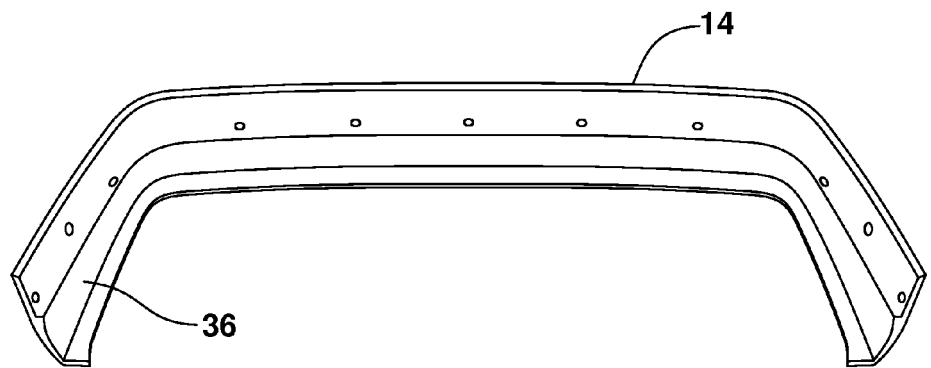
Figure 3B:
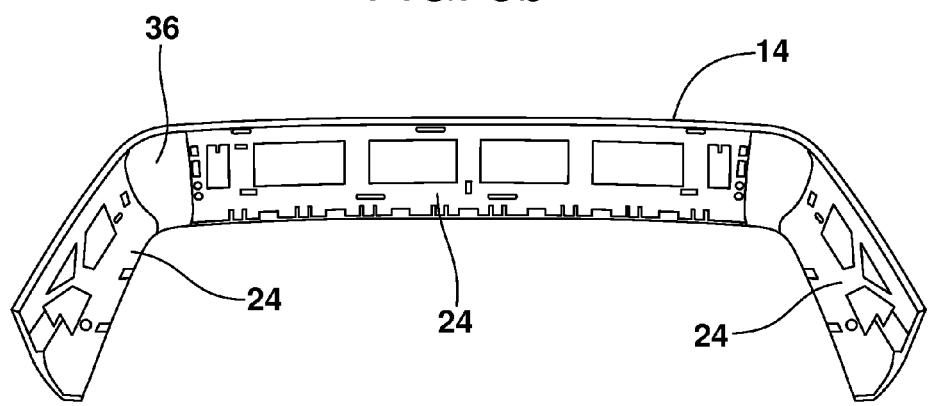
Figure 3C:
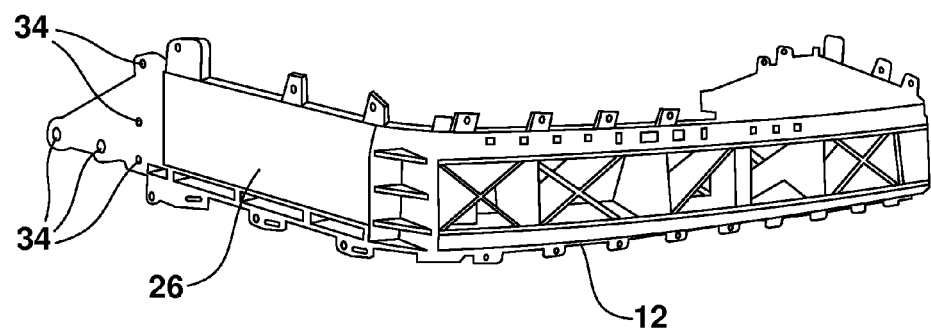
Figure 3D:
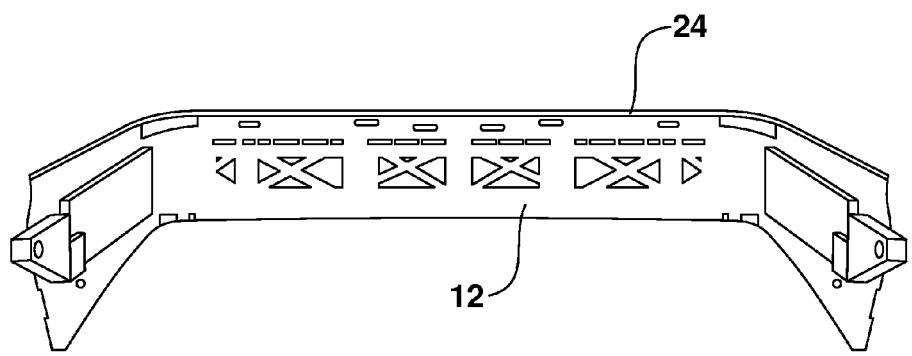
Figure 3E:
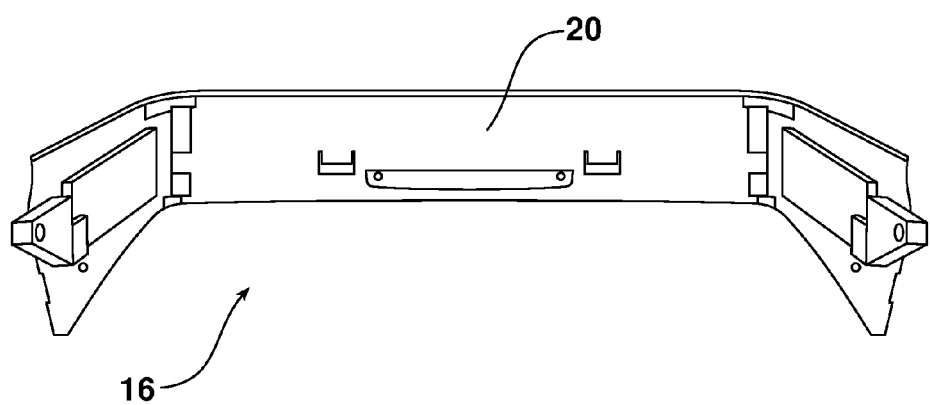
Figure 3F:
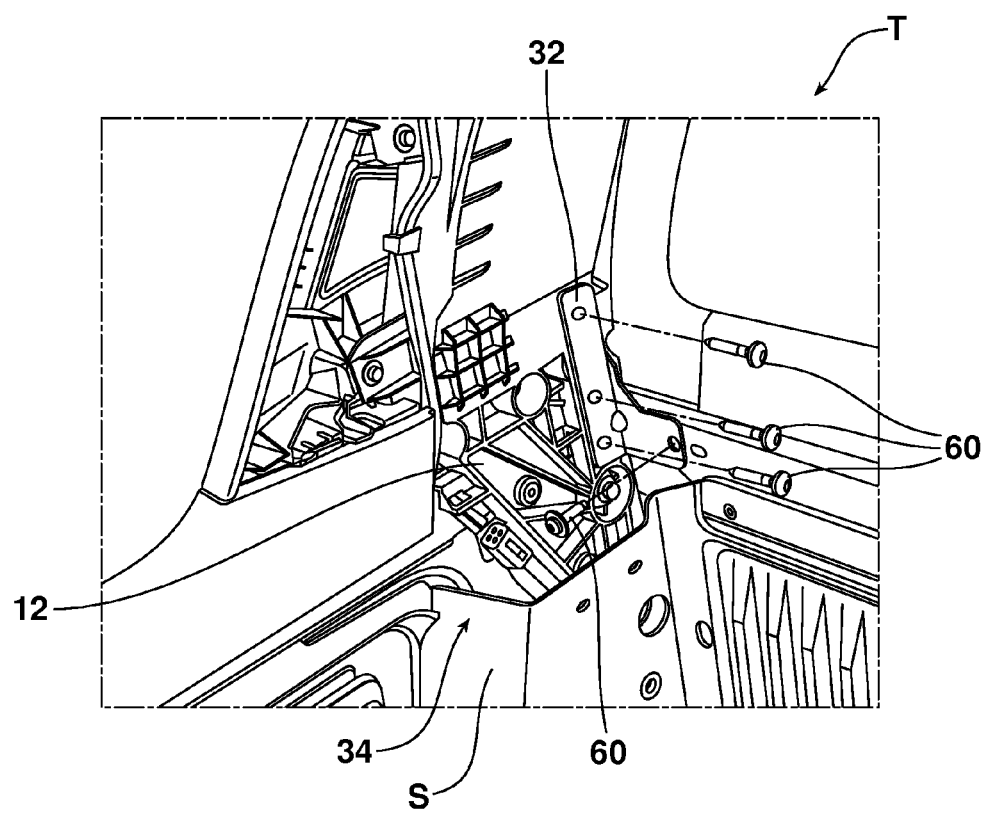
Figure 3G:
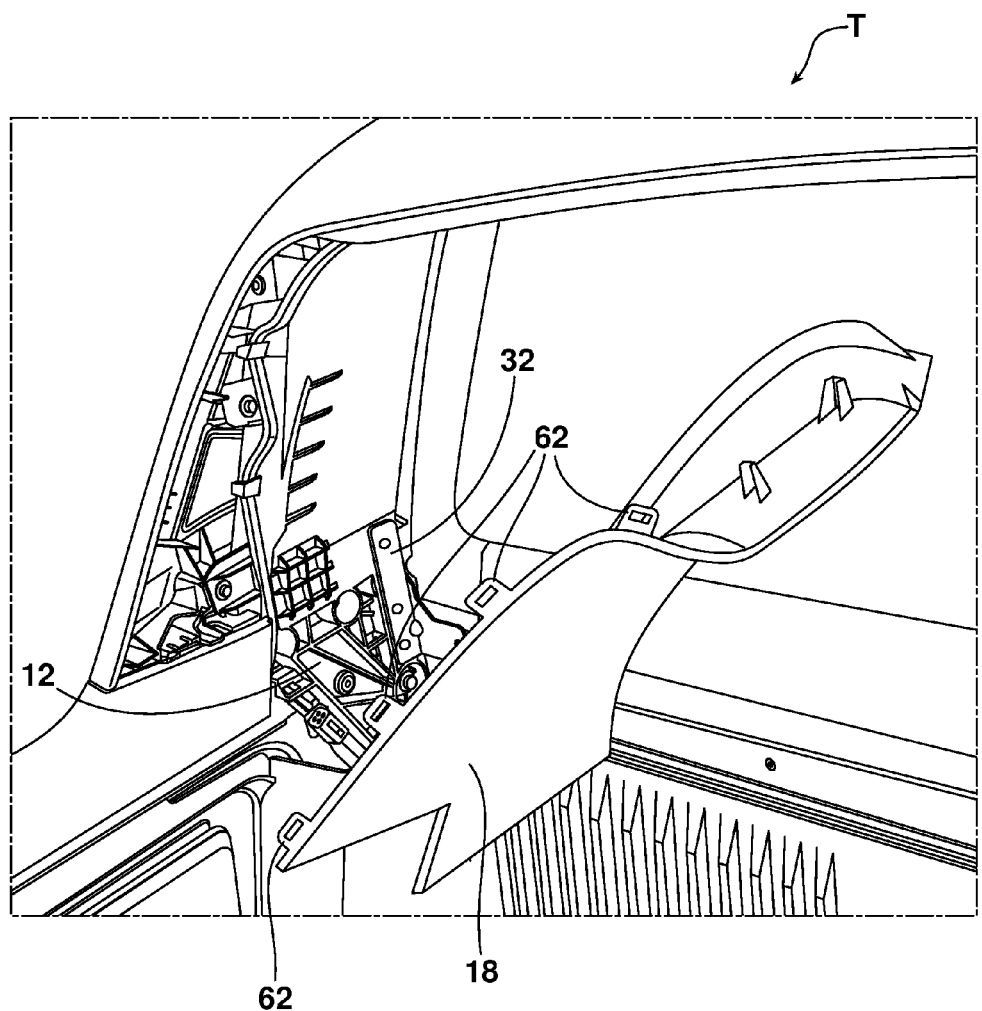
Figure 3H:
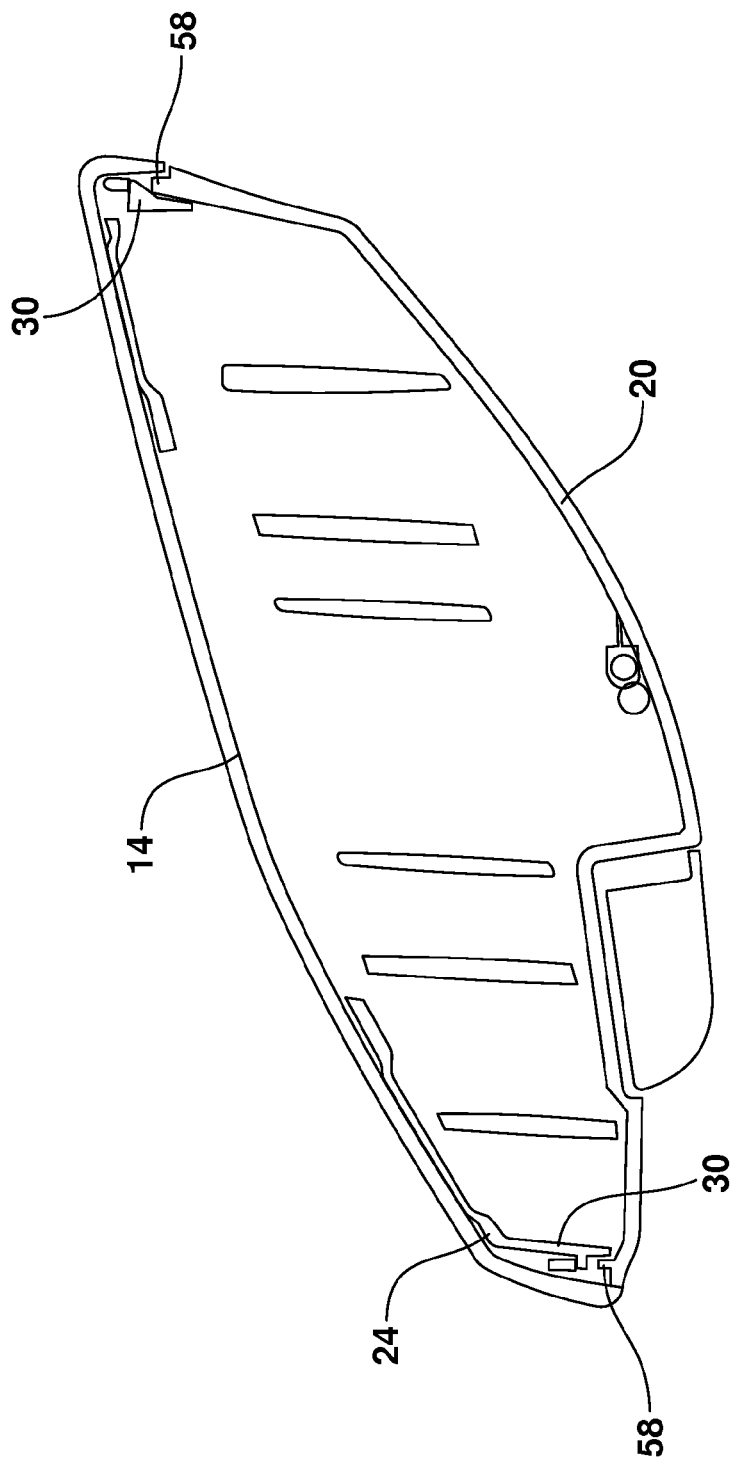

FIG. 3*h* is a cross-sectional view through the assembled sports hoop.

Figure 4A:
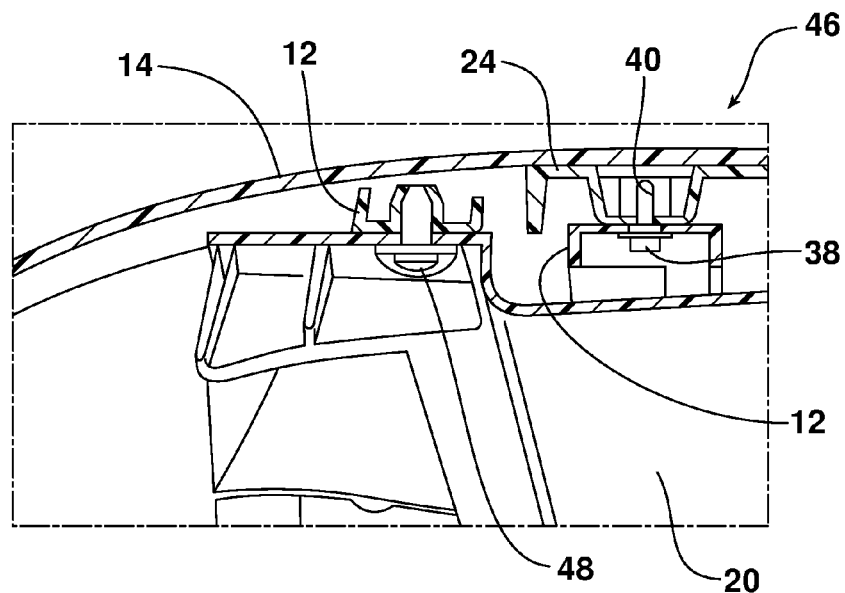
Figure 4B:
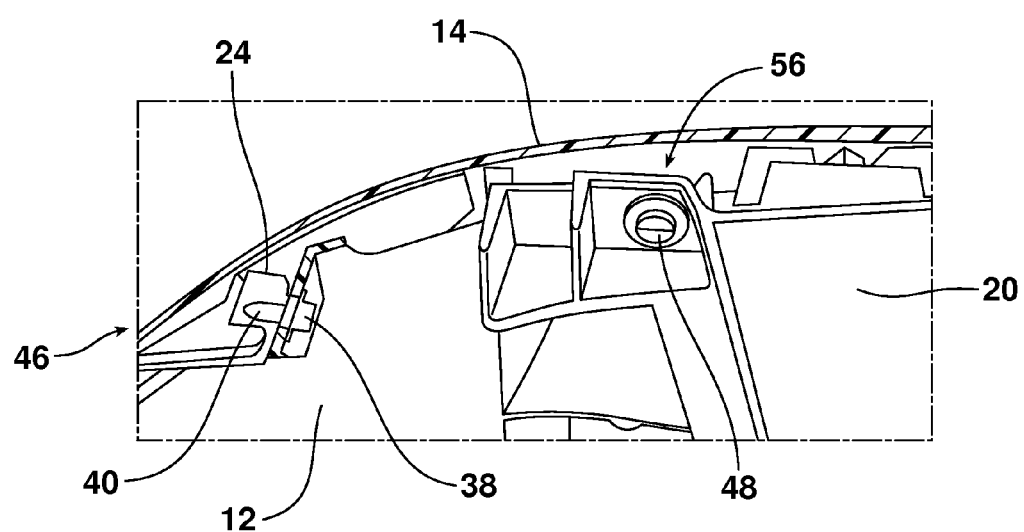

FIGS. 4*a* and 4*b* are detailed perspective views illustrating the fasteners and slip joints utilized to secure the outer and inner covers to the one-piece internal frame.

Figure 5A:
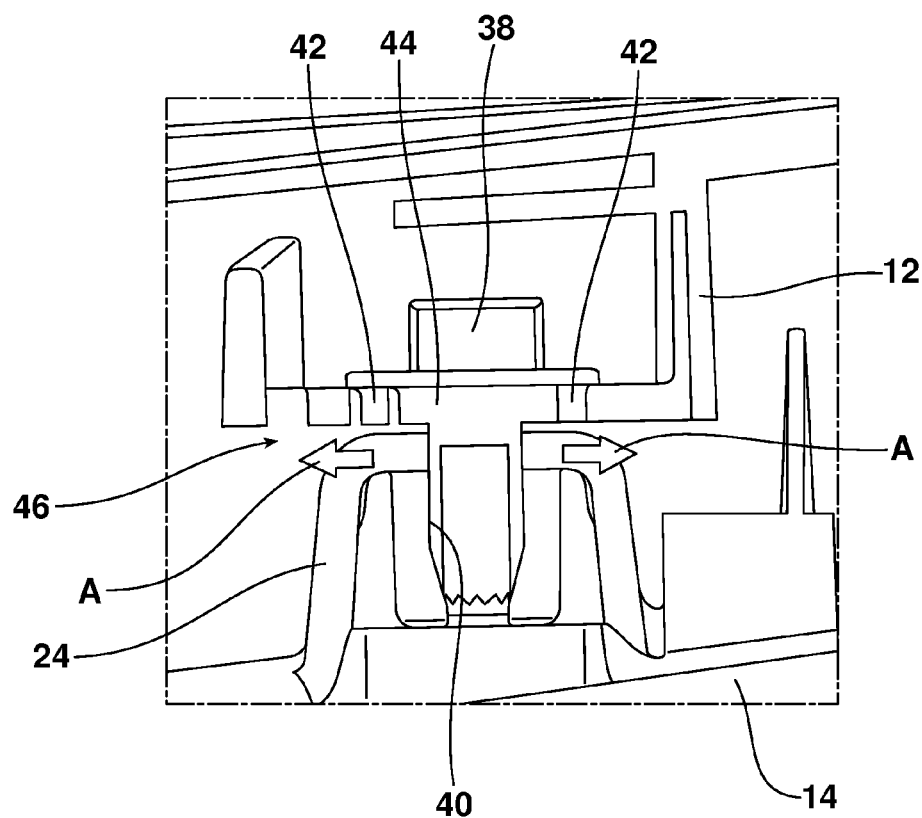
Figure 5B:
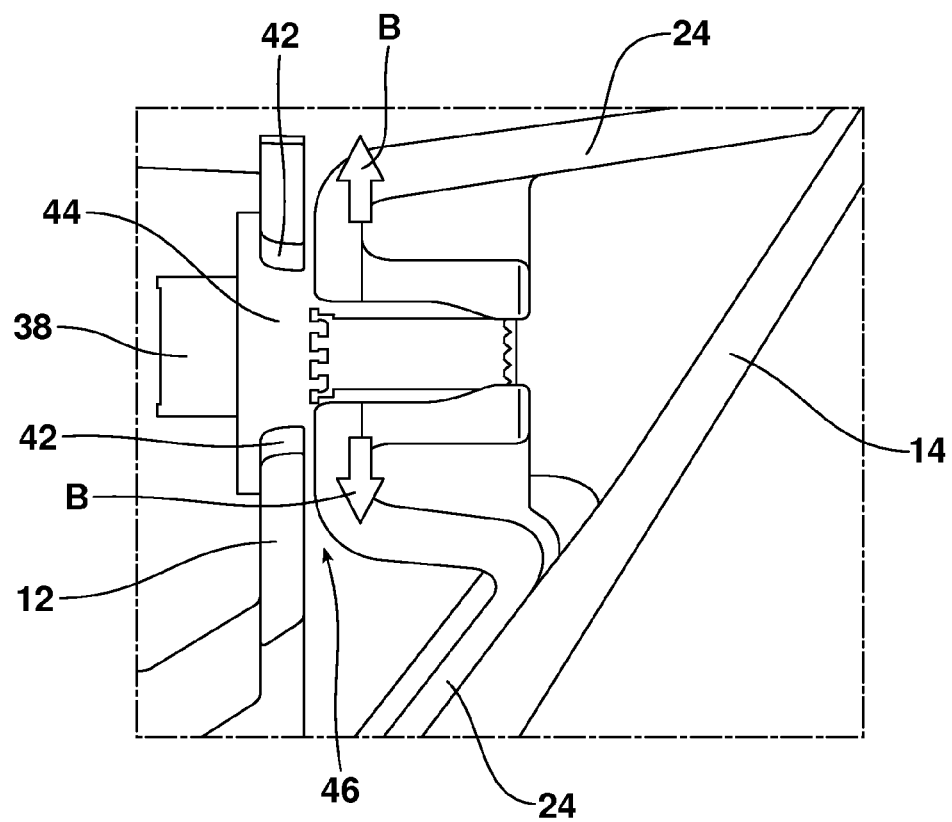
Figure 5C:
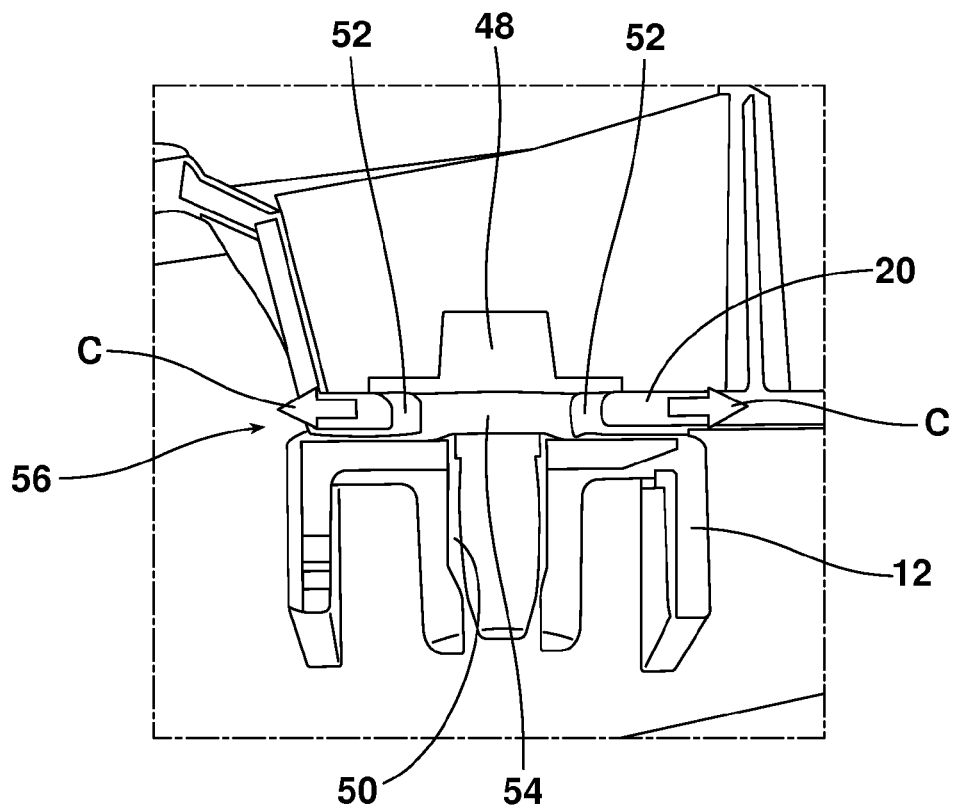

FIGS. 5*a*-5*c* are detailed cross-sectional views providing further illustration of those slip joints illustrated in FIGS. 4*a* and 4*b*.

Figure 6A:
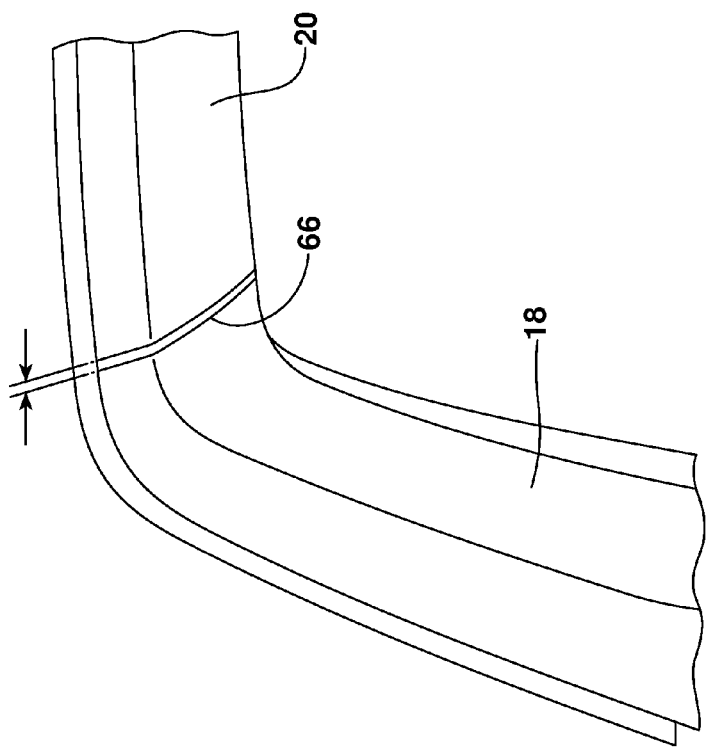
Figure 6B:
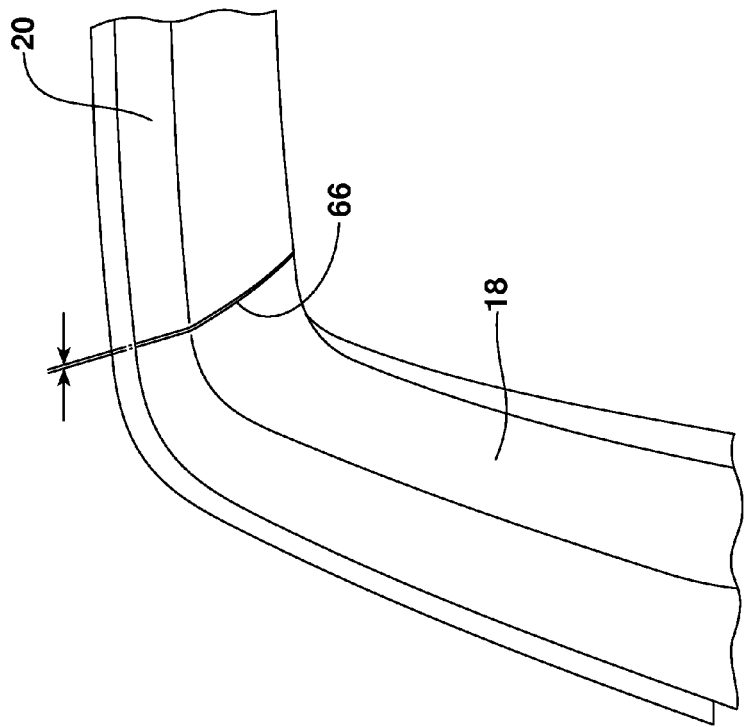

FIGS. 6*a* and 6*b* are perspective views illustrating the first expansion joint between the first end section and the center section of the inner cover in a cold-temperature-induced contracted condition and a hot-temperature-induced expanded condition.

Figure 7:
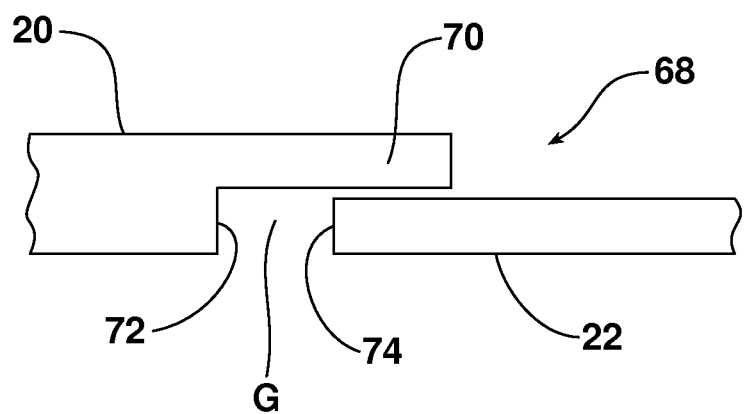

FIG. 7 is a cross-sectional view through an expansion joint illustrating the construction in additional detail.

Reference will now be made in detail to the present preferred embodiments of the sports hoop, examples of which are illustrated in the accompanying drawing figures.

DETAILED DESCRIPTION

Reference is now made to FIG. 1 illustrating a pickup truck T equipped with a sports hoop 10 which extends across the pickup truck box B just behind the cab C.

Figure 2:
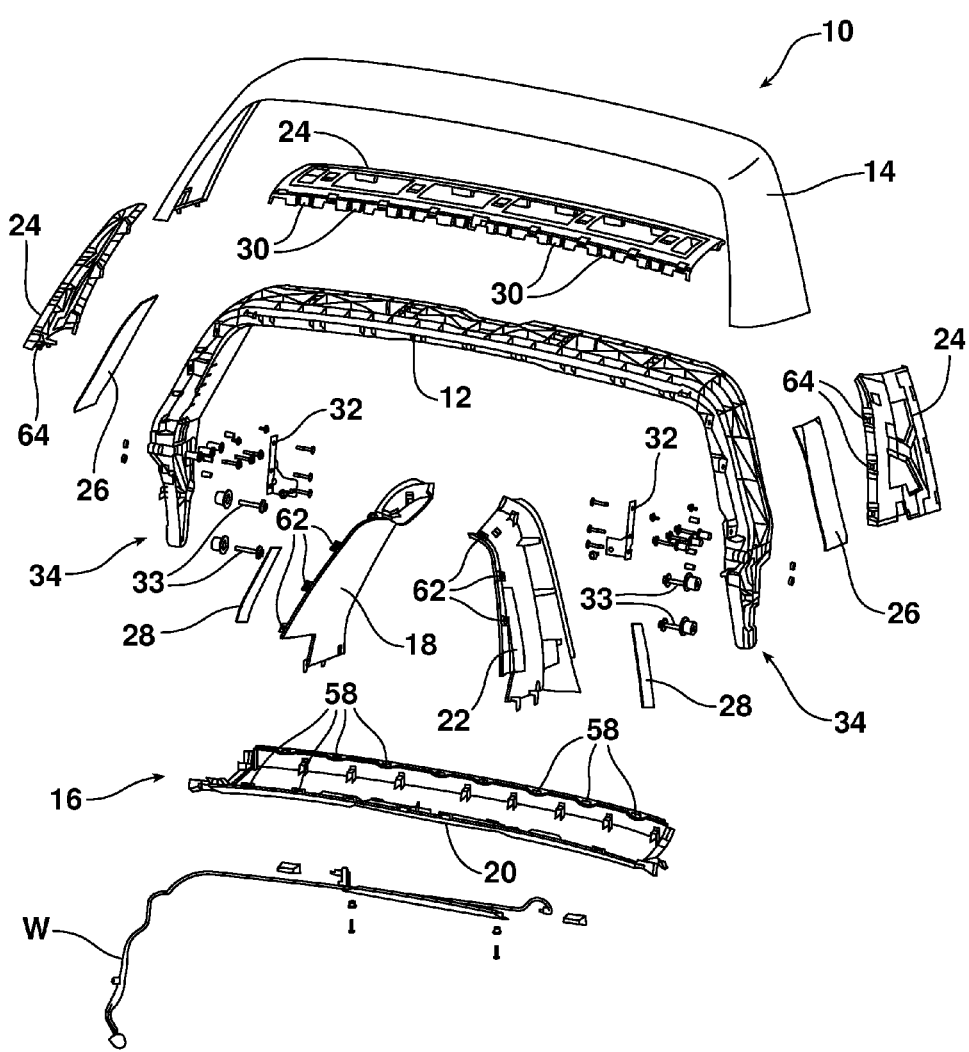
FIG. 2 is an exploded perspective view of the sports hoop.

As illustrated in FIG. 2, the sports hoop 10 includes a one-piece internal frame 12. That one-piece internal frame 12 may be injection molded from structural grade plastic material such as polypropylene long glass fiber material incorporating 40% of volume as long fiberglass of approximately 15 mm in length. Such a one-piece injected molded internal frame 12 reduces mass and increases stiffness thereby limiting noise and vibration and the damaging effects characteristic thereof.

The sports hoop 10 also includes a one-piece outer cover 14 that is received over an outer surface of the internal frame 12 and an inner cover 16 received over an inner surface of the internal frame. As illustrated, the inner cover 16 comprises a first end section 18, a center section 20 and a second end section 22. Both the one-piece outer cover 14 and the inner cover 16 may be made from a thermoplastic olefin.

A support bracket 24 is provided between the outer cover 14 and the internal frame 12. In the illustrated embodiments the support bracket 24 comprises three separate pieces. An adhesive foam 26 may be provided between the support bracket 24 and the one-piece internal frame 12. Additionally adhesive foam 28 may be provided between the first end section 18 of the inner cover 16 and the internal frame 12 and the second end section 22 of the inner cover and the internal frame.

As will be described in greater detail below, the inner cover 16 is effectively sandwiching the one-piece internal frame 12. A plurality of resilient fastening clips 30 connect to the inner cover 16 at the clip points 58. In addition two reinforced steel mounting brackets 32 may be secured to the one-piece internal frame 12 adjacent the motor vehicle mounting points 34 provided at each end of the internal frame.

Reference is now made to FIGS. 3a-3g which illustrate the steps of assembling the sports hoop 10. FIG. 3a illustrates the inner face 36 of the one-piece outer cover 14. FIG. 3b illustrates the positioning of the three-piece support bracket 24 against the inner face 36 of the outer cover 14. The three-piece bracket 24 is secured to the inner face 36 of the outer cover 14 by ultrasonic welding or other appropriate means.

FIG. 3c illustrates the one-piece internal frame 12. As illustrated, the adhesive foam 26 is connected to the internal frame 12 adjacent to the mounting points 34 provided at each end thereof (only one is visible in the drawing FIG. 3c).

The internal frame 12 including the adhesive foam components 26 is then connected to the three-piece support bracket 24 by a plurality of fasteners such as shoulder screws 38. See FIG. 3d.

As illustrated in FIGS. 4a, 4b, 5a and 5b, the shoulder screws 38 threadedly engage in cooperating apertures 40 provided in the support bracket 24. Significantly, the internal frame 12 includes apertures or openings 42 that are wider than the shoulders 44 on the screws 38 thereby providing slip joints 46 between the internal frame 12 and the support bracket 24 that is ultrasonically welded to the outer cover 14. This allows relative movement between the internal frame 12 and the support frame 24 in either direction as illustrated by action arrows A in FIG. 5a and action arrows B in FIG. 5b. A plurality or first group of such slip joints 46 are provided at spaced locations between the support bracket 24 and the internal frame 12. The slip joint 46 illustrated in FIGS. 4a and 5a is provided along the Y axis or cross vehicle direction. The slip joint 46 illustrated in FIGS. 4b and 5b is provided along the Z axis or vertical direction.

As illustrated in FIG. 3e, next the center section 20 of the inner cover 16 is secured to the internal frame 12 by means of a plurality of fasteners 48, again taking the form of shoulder screws. More specifically, as best illustrated in FIGS. 4a and 5c, a fastener 48 engages in the threaded aperture 50 in the internal frame 12. The center section 20, however, includes an aperture or opening 52 that is larger in size than the shoulder 54 on the screw 48 thereby providing a second plurality or group of slip joints 56 connecting the inner cover 16 to the internal frame 12. These allow relative movement in two directions along the Y axis or cross vehicle direction between the center section 20/inner cover 16 and the internal frame 12 (note action arrows C). In addition the plurality of clip receivers 58 integrally formed on the inner cover 16 including the center section 20 engage in cooperating fastening clips 30 on the support bracket 24 to complete the connection. Note FIG. 3h.

Next, as illustrated in FIG. 3f the sports hoop 10 is secured to the box sidewall S of the pickup truck T by means of: (a) the primary mounting bolts 33 and (b) the mounting brackets 32 and the mounting fasteners 60 which extend through the mounting brackets 32 and the one-piece internal frame 12 at each of the opposed mounting points 34 at the ends of the frame. The two remaining end sections 18, 22 of the inner cover are then secured in place on the internal frame 12 by means of the integrally formed resilient clips 62 that engage cooperating lugs 64 on the three-piece support bracket 24 (see FIG. 3g).

The first expansion joint 66 is provided between the first end section 18 and the center section 20 while a second expansion joint 68 is provided between the center section 20 and the second end section 22. FIGS. 6a and 6b are schematic illustrations of the expansion joint 66. FIG. 6a illustrates the joint 66 in the cold-temperature-induced, contracted condition while FIG. 6b illustrates the same expansion joint in the hot-temperature-induced, expanded condition. FIG. 7 is a detailed cross-section view through the expansion joint 68 showing how an indented lip 70 is provided adjacent a shoulder 72 on the center section 20. It is this lip 70 that slips under the end section 22 to keep the gap G between the shoulder 72 of the center section 20 and end edge 74 of the end section 22 closed at all times and all operating temperatures. The slip joint 66 includes a similar construction. The completely assembled sports hoop 10 is illustrated in cross-section in FIG. 3h.

As should be appreciated, the slip joints 46, 56 and expansion joints 66, 68 allow movement between the single piece outer cover 14, the internal frame 12 and the separate, inner cover 16 including the first end section 18, the center section 20 and the second end section 22 so that no stress is induced between the components upon thermal expansion and contraction. This ensures a more aesthetically pleasing product.

In summary, numerous benefits are provided by the sports hoop 10 that is the subject matter of this document. That sports hoop 10 includes a single piece or unitary internal frame 12 that is stronger and more resistant to noise and vibration than any sports hoop constructed from a multiple piece internal frame. Further, the covers 14 and 16 include slip joints 46, 56 and expansion joints 66, 68 that work in concert to allow movement between the components thereby minimizing or eliminating stress induced between the components by thermal expansion and contraction. This ensures a more aesthetic appearance under substantially any foreseeable operating temperature likely to be experienced while the sports hoop 10 is in service. Thus, for example, the slip joints 46, 56 and expansion joints 66, 68 work in concert to avoid surface defects when the outer cover 14 expands over the internal frame 12 under high thermal loading on a hot, sunny summer day, so as to maintain margins and flushness at interfacing components.

The foregoing has been presented for purposes of illustration and description. It is not intended to be exhaustive or to limit the embodiments to the precise form disclosed. Obvious modifications and variations are possible in light of the above teachings. For example, the sports hoop 10 may be equipped with an optional wiring harness W (note FIG. 2) to allow electrical connection with lights or other electrical equipment (not shown) that may be mounted to the sports hoop. All such modifications and variations are within the scope of the appended claims when interpreted in accordance with the breadth to which they are fairly, legally and equitably entitled.

What is claimed:
1. A sports hoop for a motor vehicle, comprising:
a one-piece internal frame;
an outer cover received over an outer surface of said internal frame; and
an inner cover received over an inner surface of said internal frame.

2. The sports hoop of claim 1, further including a first group of slip joints connecting said outer cover to said one-piece internal frame.

3. The sports hoop of claim 2, further including a second group of slip joints connecting said inner cover to said one-piece internal frame.

4. The sports hoop of claim 3, wherein said inner cover comprises a first end section, a center section and a second end section.

5. The sports hoop of claim 4, further including a first expansion joint between said first end section and said center section and a second expansion joint between said center section and said second end section.

6. The sports hoop of claim 5, wherein said outer cover is one continuous piece.

7. The sports hoop of claim 6, wherein said one-piece internal frame is made from structural grade plastic material.

8. The sports hoop of claim 7, wherein said structural grade plastic material is polypropylene long glass fiber 40%.

9. The sports hoop of claim 8, wherein said outer cover and said inner cover are made from thermoplastic olefin.

10. The sports hoop of claim 6, wherein said one-piece internal frame includes a motor vehicle mounting point at each end.

11. The sports hoop of claim 10, further including a support bracket between said outer cover and said one-piece internal frame.

12. The sports hoop of claim 11, wherein said support bracket is three pieces.

13. The sports hoop of claim 11, further including adhesive foam between said support bracket and said one-piece internal frame.

14. The sports hoop of claim 13, wherein said inner cover connects to said support bracket sandwiching said one-piece internal frame.

15. The sports hoop of claim 14, wherein said inner cover is connected to said support bracket by a plurality of resilient fastening clips.

16. The sports hoop of claim 15, further including two reinforced mounting brackets secured to said one-piece internal frame adjacent said motor vehicle mounting point at each end of said one-piece internal frame.

17. The sports hoop of claim 6, further including a support bracket between said outer cover and said one-piece internal frame.

18. The sports hoop of claim 17, wherein said support bracket is three pieces.

19. The sports hoop of claim 18, further including adhesive foam between said support bracket and said one-piece internal frame.

20. The sports hoop of claim 19, wherein said inner cover connects to said support bracket sandwiching said one-piece internal frame.

* * * * *